United States Patent
Royere et al.

(10) Patent No.: US 12,051,515 B2
(45) Date of Patent: Jul. 30, 2024

(54) METHOD FOR PROTECTING A NUCLEAR REACTOR AND CORRESPONDING NUCLEAR REACTOR

(71) Applicant: FRAMATOME, Courbevoie (FR)

(72) Inventors: Christian Royere, Clamart (FR); Mathieu Segond, Paris (FR)

(73) Assignee: FRAMATOME, Courbevoie (FR)

( * ) Notice: Subject to any disclaimer, the term of this patent is extended or adjusted under 35 U.S.C. 154(b) by 214 days.

(21) Appl. No.: 17/275,424

(22) PCT Filed: Sep. 12, 2019

(86) PCT No.: PCT/EP2019/074388
§ 371 (c)(1),
(2) Date: Mar. 11, 2021

(87) PCT Pub. No.: WO2020/053347
PCT Pub. Date: Mar. 19, 2020

(65) Prior Publication Data
US 2022/0051824 A1 Feb. 17, 2022

(30) Foreign Application Priority Data
Sep. 12, 2018 (FR) ...................................... 18 58153

(51) Int. Cl.
*G21D 3/00* (2006.01)
*G21C 3/04* (2006.01)
(Continued)

(52) U.S. Cl.
CPC ............. *G21D 3/001* (2013.01); *G21C 3/047* (2019.01); *G21C 9/00* (2013.01); *G21C 17/108* (2013.01)

(58) Field of Classification Search
CPC ........ G21C 9/00; G21C 17/108; G21C 17/00; G21C 3/047; G21D 3/001
See application file for complete search history.

(56) References Cited

U.S. PATENT DOCUMENTS 6,061,412 A * 5/2000 Stucker ................... G01T 3/006
376/217
2006/0129362 A1* 6/2006 Mahe ...................... G21C 17/00
703/2
(Continued)

FOREIGN PATENT DOCUMENTS

| FR | 2846139 A1 | 4/2004 |
| FR | 2946454 A1 | 12/2010 |
| WO | WO-2010142693 A1 * | 12/2010 ............. G21C 17/00 |

OTHER PUBLICATIONS

Bachoc, François, Karim Ammar, and Jean-Marc Martinez. "Improvement of code behavior in a design of experiments by metamodeling." Nuclear science and engineering 183.3 (2016): 387-406. (Year: 2016).*

(Continued)

*Primary Examiner* — Sharon M Davis
(74) *Attorney, Agent, or Firm* — Davidson Kappel LLC

(57) ABSTRACT

A method for protecting a nuclear reactor includes reconstructing a maximum linear power density released among the fuel rods of the nuclear fuel assemblies of the core; calculating the thermomechanical state and the burnup fraction of the rods; calculating a mechanical stress or deformation energy density in the cladding of one of the rods by using the said reconstructed maximum linear power density, the calculated thermomechanical states and the calculated burnup fractions, by means of a meta-model of a thermomechanical code; comparing the calculated mechanical stress or the calculated deformation energy density with a respective threshold; and stopping the nuclear reactor if the calculated mechanical stress or the calculated deformation energy density exceeds the respective threshold.

10 Claims, 6 Drawing Sheets

(51) Int. Cl.
G21C 9/00 (2006.01)
G21C 17/108 (2006.01)

(56) References Cited

U.S. PATENT DOCUMENTS

2007/0153958 A1* 7/2007 Russell, II ............. G21D 3/001
376/259
2010/0260300 A1* 10/2010 Andre Poyaud ....... G21D 3/001
376/245

OTHER PUBLICATIONS

Corresponding Search Report for PCT/EP2019/074388.
Corresponding Search Report for FR1858153.
Vincent Hessiron et al. "Areva's PCI Methodologies for PWR Enhanced Plant Maneuverability", Proceedings of WRFPM, vol. 100158, Sep. 14, 2017, pp. 1-9.

* cited by examiner

METHOD FOR PROTECTING A NUCLEAR REACTOR AND CORRESPONDING NUCLEAR REACTOR

The present disclosure relates in general to the protection of nuclear reactors against the risks of rupture of the fuel rod cladding by pellet-cladding interaction (PCI).

BACKGROUND

Today, on French pressurized water reactors equipped with four primary loops, protection against the risk of cladding rupture by PCI is ensured by an automatic reactor shutdown on high linear power.

In other words, the reactor protection system periodically evaluates, with a short time constant, the linear power of the nuclear fuel rods and triggers an automatic shutdown of the reactor if the linear power in a fuel rod section exceeds a predetermined maximum value.

The rupture of the cladding by PCI is the result of a thermomechanical phenomenon. Linear power is a parameter that is not entirely shown to be representative of the physical phenomenon leading to the risk.

In order to take into account this deviation, it is necessary to establish an envelope correlation between the physical phenomenon leading to the risk and the linear power.

This is penalizing with respect to the margins of maneuver for reactor control.

SUMMARY

In this context, the present disclosure provides a method to protect a nuclear reactor against the risks of rupture of fuel rod cladding by PCI, which is less penalizing for reactor control.

To this end, the present disclosure provides in a first aspect to a method for protecting a nuclear reactor comprising a core having a plurality of nuclear fuel assemblies, each assembly comprising a plurality of fuel rods, each rod comprising a cladding and a nuclear fuel enclosed in the cladding, the method comprising the following steps:

Step (S12): Reconstructing a maximum linear power density among the fuel rods of the nuclear fuel assemblies of the core;

Step (S14): Calculating the thermomechanical state and the burnup fraction of the fuel rods;

Step (S24): Calculating a mechanical stress or the deformation energy density in the cladding of one of the fuel rods using the said reconstructed maximum linear power, the calculated thermomechanical state and the calculated burnup fraction, using a meta-model of a thermomechanical code;

Step (S30): Comparing the calculated mechanical stress or the calculated deformation energy density with a respective threshold;

Step (S32): Stopping the nuclear reactor if the calculated mechanical stress or the calculated deformation energy density exceeds the respective threshold.

As explained above, the cladding rupture by PCI is due to a thermomechanical phenomenon, the representative parameter being the mechanical stress in zircaloy cladding, or the deformation energy density (DED) for M5 cladding.

The present disclosure makes it possible to calculate on-line, in the protection system of the nuclear reactor, the evolution of the stress or of the deformation energy density, and to compare it to a threshold. It is the exceeding of the threshold that triggers the automatic shutdown of the reactor.

This threshold corresponds directly to the technological limit leading to the rupture. In other words, the technological limit of the fuel becomes directly the threshold triggering the automatic shutdown of the reactor. The reactor is therefore protected from rupture by PCI based on direct monitoring of the physical thermomechanical parameter conditioning the rupture.

The on-line calculation of the stress or DED is carried out with a time constant compatible with the reactor protection requirements thanks to the use of a meta-model of the thermomechanical code. Such a meta-model allows the calculation of the mechanical stress or the deformation energy density extremely fast, much faster than a conventional thermomechanical code typically operating with finite elements.

Since the reactor is protected directly from the monitoring of the physical parameter conditioning the rupture, it is not necessary to use an envelope correlation of the type mentioned above, so that the reactor's margins of maneuverability are improved.

The protection method may also have one or more of the following features, considered individually or in all technically possible combinations:

the step of reconstruction of the maximum linear power is carried out using measurements provided continuously by neutron flux sensors;

the reconstruction step is performed with a time constant of less than 1 minute;

the step of calculating the thermomechanical state and the fuel rod burnup fraction includes a sub-step of calculating the three-dimensional power distribution in the core, and a sub-step of calculating the fuel rod burnup fraction using the calculated three-dimensional power distribution;

the step of calculating the thermomechanical state and the fuel rod burnup fraction includes a sub-step of calculating the thermomechanical state of the rods using a thermomechanical code, using the calculated three-dimensional power distribution;

the step of calculating the thermomechanical state and burnup fraction of the fuel rods includes a sub-step of storing the thermomechanical state and the calculated burnup fraction for a control section of one of the fuel rods;

the control section is the section with the maximum linear power;

the meta-model of the thermomechanical code uses at least the following inputs: mechanical stress or deformation energy density calculated at the previous time step, reconstructed maximum linear power, derived with respect to time from the reconstructed maximum linear power, fuel rod burnup fraction calculated for the control section;

the meta-model of the thermomechanical code is a multilayer neural network;

a predetermined bias is applied to the threshold considered for the comparison step;

the method includes a bias determination step, comprising the following sub-steps:

Sub-step (S34): Calculating the initial thermomechanical state and initial fuel rod burnup fraction;

Sub-step (S36): Calculating the evolution over time of the mechanical stress or of the deformation energy density in the cladding of the fuel rods from the calculated initial thermomechanical state and the calculated initial fuel rod burnup fraction, for at least one accidental transient, using the said thermomechanical code;

Sub-step (S38): Determining the calculated maximum mechanical stress or of the calculated deformation energy density using said thermomechanical code;

Sub-step (S42): Calculating the evolution over time of the mechanical stress or of the deformation energy density in the cladding of the fuel rods from the initial thermomechanical state and the initial fuel burnup fraction at the location of the calculated maximum linear power of the fuel rods, for the said at least one accidental transient, using the said meta-model of the thermomechanical code, taking into account a simulation of the evolution of the said reconstructed maximum linear power in the step (S12);

Sub-step (S46): Determining the calculated maximum mechanical stress or calculated deformation energy density using the said meta-model of the thermomechanical code;

Sub-step (S48): Determining the bias, based on the difference between the calculated mechanical stress or calculated deformation energy density using the said thermomechanical code on the one hand and the calculated maximum mechanical stress or calculated deformation energy density using the said thermomechanical code meta-model on the other hand.

According to a second aspect, the present disclosure provides a nuclear reactor comprising:

a core having a plurality of nuclear fuel assemblies, each assembly comprising a plurality of fuel rods, each rod comprising a cladding and nuclear fuel enclosed in the cladding, a reactor monitoring and protection assembly, comprising a computer configured to implement the method having the above features.

According to a third aspect, the present disclosure provides a computer program comprising instructions for carrying out the steps of the method having the above features.

According to a fourth aspect, the present disclosure provides a device usable in a computer and on which the above program is recorded.

BRIEF SUMMARY OF THE DRAWINGS

Other features and advantages will emerge from the detailed description, which is given below, by way of indication, also limiting, with reference to the appended figures, among which.

DETAILED DESCRIPTION

Figure 1:
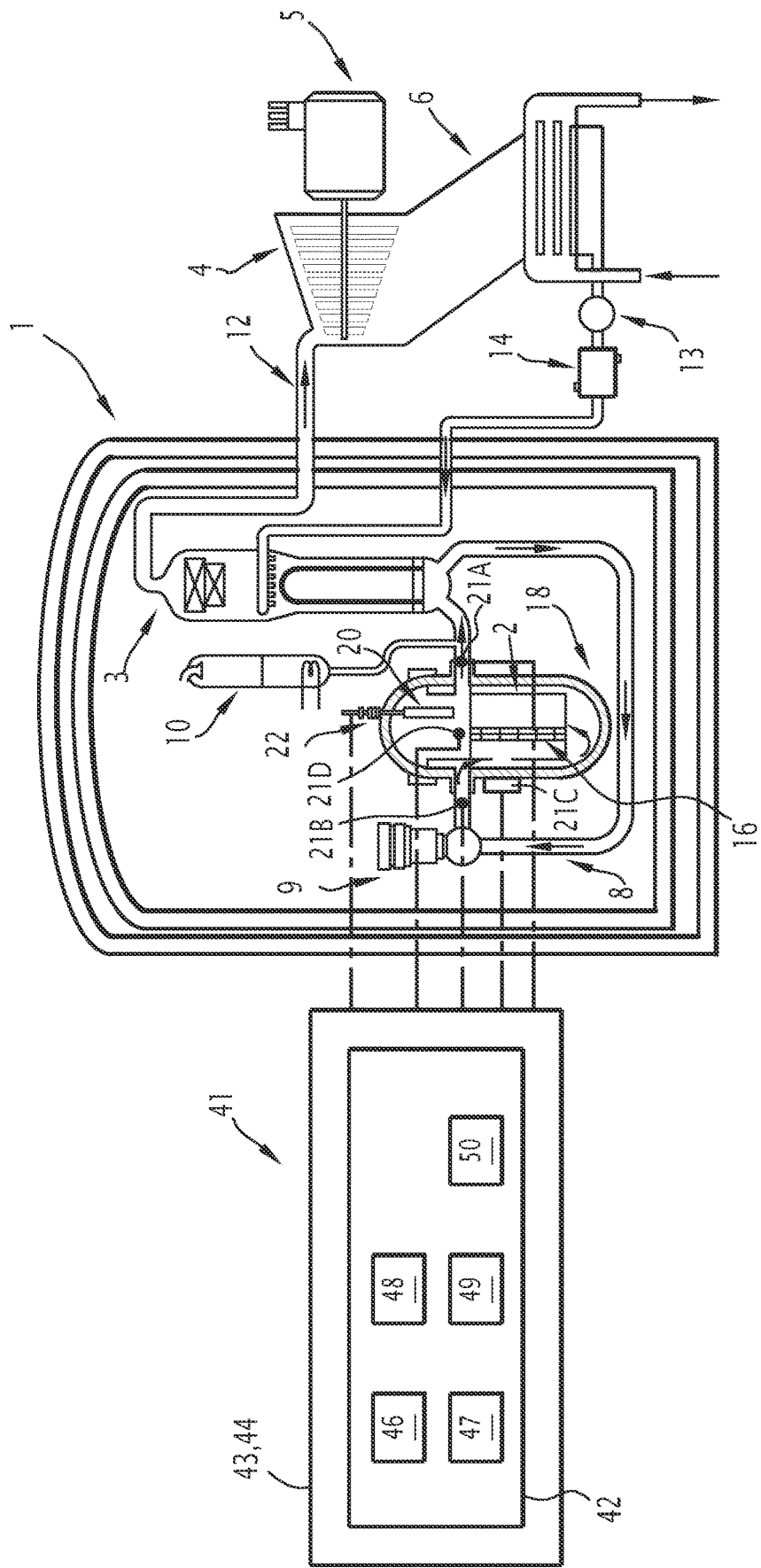
FIG. 1 is a schematic view illustrating a pressurized water nuclear reactor.

FIG. 1 schematically illustrates a nuclear reactor 1 comprising a core 2.

The nuclear reactor 1 is typically a pressurized water reactor, and includes:

at least one steam generator 3, a turbine 4 coupled to a generator 5 of electrical energy, and a condenser 6.

The reactor 1 comprises a primary circuit 8 equipped with at least one pump 9 and in which pressurized water circulates, according to the pathway shown by the arrows in FIG. 1. This water rises in particular through the core 2 to be reheated there while ensuring the cooling of core 2.

The primary circuit 8, in addition, comprises a pressurizer 10 to pressurize the water circulating in the primary circuit 8 and to control the said pressure.

The water of the primary circuit 8 also feeds the or each steam generator 3 where it is cooled by ensuring the vaporization of water circulating in a secondary circuit 12.

The steam produced by the or each generator 3 is channeled through the secondary circuit 12 towards the turbine 4 and then to the condenser 6 where this steam is condensed by indirect heat exchange with cooling water circulating in the condenser 6.

The secondary circuit 12 includes downstream of condenser 6 a pump 13 and a heater 14.

In a conventional manner also, the core 2 comprises a plurality of nuclear fuel assemblies 16.

These assemblies 16 are loaded into a tank 18. A single assembly 16 is shown in FIG. 1, but the core 2 comprises, for example, 157 assemblies 16.

The reactor 1 includes control rod clusters 20 that are placed in the vessel 18 above certain fuel assemblies 16. A single cluster 20 is shown in FIG. 1, but the core 2 may include, for example, about 60 clusters 20.

The clusters 20 are moved by mechanisms 22 to be inserted into the fuel assemblies 16 that they overhang.

Conventionally, each control cluster 20 includes rods with one or more neutron-absorbing materials.

Thus, the vertical movement of each cluster 20 allows the reactivity of the reactor 1 to be adjusted and allows variations in the overall power P supplied by core 2 from zero power to nominal power NP, depending on the insertion of the clusters 20 into the assemblies 16.

Some of these clusters 20 are intended to regulate the operation of core 2, for example in power or in temperature, and are called control clusters. Others are intended solely for the shutdown of reactor 1 and are called shutdown clusters.

The clusters 20 are grouped together in groups according to their nature and purpose. For example, for the majority of the 900 MWe type reactors, these groups are referred to as groups G1, G2, N1, N2, R, SA, SB, SC, SD . . .

The reactor 1 also includes a number of sensors for measuring actual values of reactor operating parameters, especially a thermocouple 21A for measuring the average temperature of the water in the primary circuit at the outlet of the vessel 18 and a thermocouple 21B for measuring the average temperature of the water in the primary circuit at the inlet of the vessel 18.

Also in a conventional way, the nuclear reactor 1 includes sensors for measuring the neutron flux in core 2 of the reactor, operating continuously.

Typically these sensors are external chambers 21C arranged around the vessel 18. The number and positions of the chambers 21C, usually referred to as "ex-core chambers", vary according to the model of the reactor 1.

Also in a conventional way, the reactor 1 includes thermocouples 21D arranged in the core 2 above the assemblies 16 to measure the temperature of the water in the primary circuit at the outlet of the assemblies 16.

A single chamber 21C and a single sensor 21D have been shown in FIG. 1.

In addition to or in place of the ex-core chambers, some reactors include fixed internal chambers for continuous measurement of the neutron flux (not shown), which are arranged inside certain fuel rod assemblies placed in the core. The number and the positions of these fixed chambers, usually referred to as "in-core" chambers, vary according to the reactor model. These chambers are, for example, a cobalt SPND.

The ex-core chambers 21C and thermocouples 21D or the fixed in-core chambers provide continuous information related to the three-dimensional distribution of local power in the core.

The nuclear reactor 1 even includes devices that allow the following quantities to be measured or reconstructed: positions of the clusters 20 in the core, pressure in the pressurizer 10, rotation speed of the or each primary pump 9.

Figure 2:
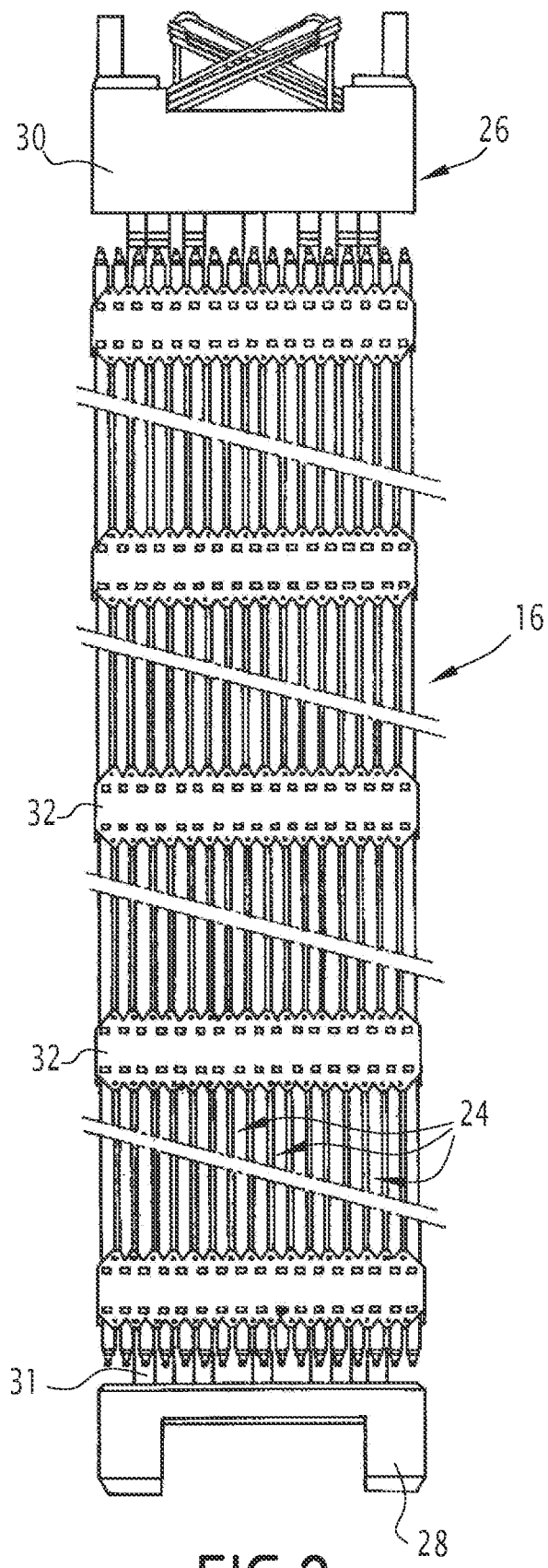
FIG. 2 is a schematic side view of a reactor core fuel rod assembly from FIG. 1.

As shown in FIG. 2, each assembly 16 includes in a conventional manner a plurality of fuel rods 24. These fuel rods are arranged in a network and held in position by a skeleton 26 supporting the fuel rods 24.

The skeleton 26 conventionally comprises a lower end cap 28, an upper end cap 30, the guide tubes 31 connecting the two end caps 30 and 28 and intended to receive rods from the control clusters 20 and spacer grids 32.

Figure 3:
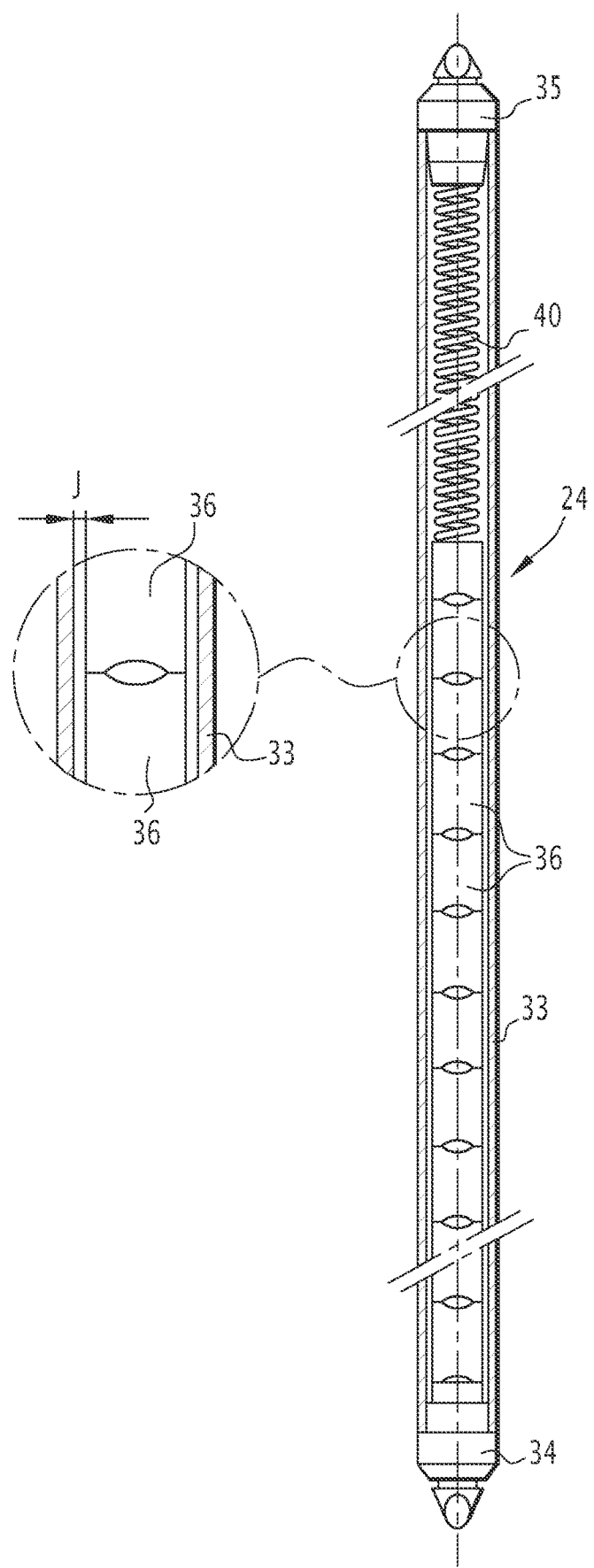
FIG. 3 is a schematic longitudinal section view of a fuel rod of the assembly in FIG. 2.

As shown in FIG. 3, each fuel rod 24 includes, in the conventional way, a cladding 33 and a nuclear fuel enclosed in the cladding 33.

The cladding 33 is a longitudinal tube closed at its lower longitudinal end by a lower plug 34 and at its upper longitudinal end by an upper plug 35.

The nuclear fuel includes a series of pellets 36 stacked in the cladding 33 and resting against the lower plug 34. A retaining spring 40 is arranged in the upper section of the cladding 33 to press against the upper plug 35 and on the upper pellet 36.

Conventionally, the pellets 36 are based on uranium oxide and the cladding 33 is for example made of a zirconium alloy called zircaloy.

In FIG. 3, which corresponds to a fuel rod 24 after manufacture and before irradiation, there is a radial clearance J between the pellets 36 and the cladding 33. This is illustrated more especially by the enlarged circled part of FIG. 3.

When the reactor 1 is going to operate, for example at its nominal overall power NP, the nuclear fuel of the pellets 36 will be, according to the term used in the technique, conditioned.

Conditioning is characterized essentially by the closure of the clearance J between the pellets 36 and the cladding 33, due to the creep of the cladding 33 and the swelling of the pellets 36.

More specifically, the following steps can be distinguished for each pellet 36:

1) Under the effect of the pressure difference between the outside (primary circuit water 8) and the inside of the fuel rod 24, the cladding 33 gradually deforms by the radially inward creeping of the fuel rod 24. All other things being equal, the creep rate of the cladding 33 is a characteristic of the material of which it is made. Furthermore, the fission products, which are mostly retained in the pellet 36, induce swelling of the pellet 36. During this phase, the stress loading of the cladding 33 is solely due to the differential pressure existing between the outside and the inside of the fuel rod 24. The stresses in the cladding 33 are compressive stresses (conventionally negative).

2) The contact between the pellet 36 and the cladding 33 begins after a period of time which depends essentially on the local irradiation conditions (power, neutron flux, temperature . . . ) and the material of the cladding 33. In reality, the contact is established progressively over a period that begins with a soft contact followed by the establishment of a strong contact. The contact pressure of the oxide of the pellet 36 on the inner face of cladding 33 leads to an inversion of the stresses in the cladding 33 which become positive and tend to stress the cladding in tension.

3) The swelling of the pellet 36 continues and then imposes its deformation on the cladding 33 towards the outside. Under steady state conditions, this expansion is slow enough that the relaxation of the cladding 33 material leads to equilibrium of the stresses in the cladding 33. An analysis shows that under these conditions the level of tensile stresses is moderate (a few tens of MPa) and does not present a risk to the integrity of the cladding 33.

If there is no risk of rupture of the cladding 33 in steady state due to the thermomechanical equilibrium in the cladding 33 at fairly low stress levels, a risk does appear on the other hand as soon as the power supplied by the fuel rod 24 varies greatly.

This is because an increase in power leads to an increase in temperature in the fuel rod 24. Given the difference in mechanical characteristics (coefficient of thermal expansion, Young's modulus) and the difference in temperature between the pellet 36 in uranium oxide and the cladding 33 in zirconium alloy, the pellet 36 will expand more than the cladding 33 and impose its deformation on the latter.

On the other hand, the presence of the space between the cladding 33 and the pellet 36 of corrosive fission products, such as iodine, creates the conditions for stress corrosion. Thus, the deformation imposed by the pellet 36 on the cladding 33 during a transient, or power variation, can cause the cladding 33 to rupture.

However, such a rupture of the cladding 33 is not permissible for safety reasons since it could result in the release of fission products into the primary circuit 8.

Power transients may occur during normal operation of the reactor 1, i.e., in so-called Category 1 situations. Indeed, power variations may be necessary, in particular to adapt to the electrical energy needs of the network that the generator 5 feeds. Power transients may also occur in so-called Category 2 accident situations, such as excessive load increase, uncontrolled withdrawal of the clusters 20 in power, dilution of boric acid or undetected fall of the clusters 20.

The reactor 1 also includes a reactor monitoring and protection assembly 41 including an information processing device 42.

The assembly 41 includes a reactor protection system 43.

The reactor protection system 43 is configured to protect the nuclear reactor 1 against a certain number of risks, and in particular against the risk of fuel rod cladding rupture by PCI.

The reactor protection system 43 receives the information detected by the sensors equipping the nuclear reactor, and automatically triggers the shutdown of the nuclear reactor in the event of a risk, in particular if there is a risk of fuel rod cladding rupture by PCI. The acquisition of information from the sensors and the triggering of the automatic shutdown of the reactor are carried out with a short time constant, compatible with the kinetics of the physical phenomena at the origin of the risks to be treated.

The assembly 41 also includes a reactor monitoring system 44.

The reactor monitoring system 44 is configured to continuously monitor the operation of the core.

The reactor monitoring system 44 receives the information recorded by the sensors equipping the nuclear reactor and calculates quantities characteristic of the reactor operation. It triggers alarms when these quantities are outside the authorized operating range.

The reactor monitoring and protection assembly 41 is informed in particular by the thermocouples 21A, 21B and 21D. It is also informed, in particular, by the ex-core chambers 21C and/or the in-core chambers, and by the devices designed to measure or reconstruct the positions of the clusters 20 in the core, the pressure in the pressurizer 10, and the speed of rotation of the primary pump(s) 9.

The data processing device 42 typically comprises a processor and a memory related to the processor. Various software or calculation codes are stored in the memory, as described below.

Alternatively, the processing device is realized in the form of programmable logic components, such as FPGAs (Field-Programmable Gate Array), or in the form of dedicated integrated circuits, such as ASICs (Application-Specific Integrated Circuits).

In order to guarantee the integrity of the fuel rods 24 with respect to the interaction between the pellets 36 and the cladding 33, the present disclosure provides a protection method during which the mechanical stress or the deformation energy density in the cladding of at least one of the fuel rods is calculated, the method comprises a step of shutting down the reactor if the calculated mechanical stress or the calculated deformation energy density exceeds a respective predetermined threshold.

The information processing device 42 is configured to implement the nuclear reactor protection method that will be described below.

Figure 4:
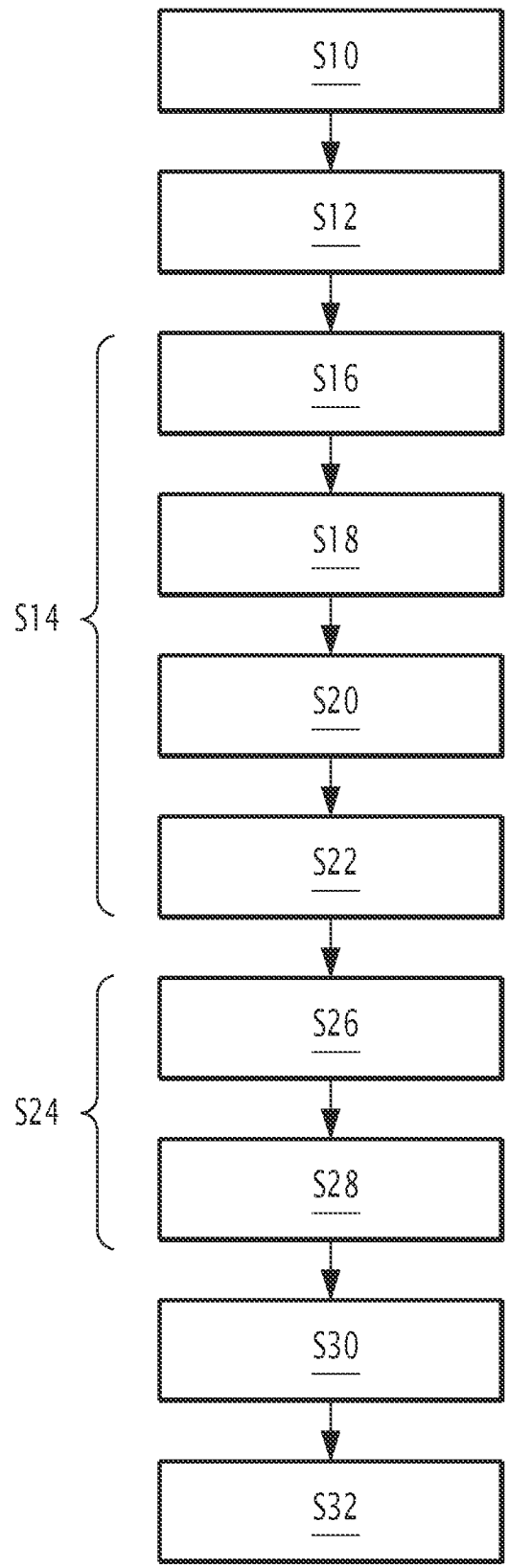
FIG. 4 is a step diagram illustrating the method for protecting according to the present disclosure.

This method is illustrated in FIG. 4.

The protection method consists of the following steps:

step S12: reconstructing a maximum linear power $P_{lin}^{max}$ released among the fuel rods 24 of the nuclear fuel assemblies 16 of the core 2;

step S14: calculating the thermomechanical state and the burnup fraction of the fuel rods 24;

step S24: calculating a mechanical stress (sub-step S26) or a deformation energy density (DED) (sub-step S28) in the cladding 33 of one of the fuel rods 24 using the said reconstructed maximum linear power, the calculated thermomechanical states and the calculated burnup fraction of the fuel rods, using a meta-model of a thermomechanical code;

step S30: comparing the calculated mechanical stress or the calculated deformation energy density with a respective threshold;

step S32: stopping the reactor 1 if the calculated mechanical stress or the calculated deformation energy density exceeds the said respective threshold.

The different steps above are carried out repeatedly, with a time constant that will be described below.

During step S12, the protection system 43 reconstructs in particular the maximum linear power released by each of the fuel rods of the nuclear fuel assemblies, typically using the information provided by the ex-core chambers 21C or by the in-core chambers.

This reconstruction is carried out by the software 46, integrated in the information processing device 42. This software is known per se and will not be described in detail here.

The power output per unit of longitudinal length of the fuel rod is considered here.

In other words, the step S12 includes an operation to determine how the maximum power density per unit of length varies over time.

The step of reconstructing the maximum linear power $P_{lin}^{max}$ is thus carried out using measurements provided continuously by the neutron flux sensors (ex-core chambers 21C or in-core chambers).

The reconstruction step S12 is performed periodically, with a time constant of less than one minute, preferably less than 10 seconds, and more preferably less than 1 second, typically of the order of 0.5 s.

The step S14 for calculating the thermomechanical state and the rate of fuel rod burnup fraction comprises:
a sub-step S16 for calculating the three-dimensional power distribution in core 2; and
a sub-step S18 to calculate the burnup fraction of the fuel rod using the calculated three-dimensional power distribution.

The thermomechanical state considered here is the mechanical stress σ, for example the tangential stress in the inner skin $\sigma_{\theta\theta}$ or the difference between the tangential stress $\sigma_{\theta\theta}$ and the radial stress $\sigma_{rr}$.

The step S14 is performed using software integrated in the monitoring system 44.

The sub-steps S16 and S18 are performed by the software 47 using a neutron code of the core. This software uses, for example, the SMART code of the SCIENCE chain. It is known and will not be described in detail here.

The software 47 calculates the three-dimensional power distribution in the core using the measurements provided continuously by the ex-core chambers 21C and the thermocouples 21D or fixed in-core chambers. The application FR 2787196 describes for example a method to obtain the three-dimensional power distribution in the core using at least this information.

Typically, the software 47 uses the thermal power of the core, which is calculated by enthalpic balance, the axial power imbalance provided by the ex-core chambers 21C, the position of the clusters, the vessel inlet temperature and flow rate, the pressurizer pressure and the core outlet temperatures provided by the thermocouples 21D.

In sub-step S16, the power is calculated at any point of the core 2.

At sub-step S18, the burnup fraction TE is calculated at any point of core 2. More precisely, it is calculated according to an axial mesh fixed by the axial mesh of the neutron code used by the monitoring system 44, typically by the SMART code.

The local burnup fraction results from the integration over time of the local power.

The step S14 also includes a sub-step S20 for calculating the thermomechanical state of the fuel rods 24 by the means of a thermomechanical code, using the calculated three-dimensional power distribution.

The thermomechanical code is, for example, the COPERNIC 48 code developed by the Framatome company. This calculation code 48 is known and will not be detailed here. It is typically implemented in the monitoring system 44.

In sub-step S20, the thermomechanical state is calculated at any point of the core, i.e. at any point of each of the fuel rods 24 of the core 2.

The step S14 also includes a sub-step S22 to store the calculated thermomechanical state and the calculated burnup fraction for a control section of one of the fuel rods 24.

The control section is preferably the section with the maximum linear power. This control section is determined using the data provided by the software 47 integrated in the monitoring system 44.

This information is stored in the memory 49 of the data processing device 42.

The step S14 is carried out repeatedly, with a time constant of the order of one hour. Indeed, the thermomechanical state of the fuel rods 24 is essentially conditioned by the operating time of the nuclear reactor on intermediate power, which is normally one or more days. The calculation of the thermomechanical state of the fuel rods using the thermomechanical code COPERNIC 48 requires about one hour, which is largely satisfactory.

Because the calculated thermomechanical state and the calculated burnup fraction for the control section are used by the nuclear reactor protection system 43, it is necessary that this information be available in a perennial manner, even in the event of a loss of the monitoring system 44, which does not have the same classification as the protection system 43. Thus, it is foreseen that the storage of this information in the memory 49 has the same classification as the protection system 43 from the safety point of view.

Alternatively, it is possible to provide for the surveillance system 44 having the same classification as the protection system 43 from the safety point of view.

The mechanical stress G calculated in the sub-step S26 is for example the circumferential and normal stress $\sigma_{\theta\theta}$ in the cladding 33. Alternatively, it is the difference between the circumferential and normal stress $\sigma_{\theta\theta}$ and the radial and normal stress $\sigma r$, called TRESCA stress.

Typically, the mechanical stress G is calculated in the step S24 when the cladding 33 is made of zircaloy.

For fuels with M5 cladding, it is planned in the step S24 to calculate the deformation energy density in the cladding 33 of one of the fuel rods in sub-step S28. The deformation energy density (DED) is defined as follows:

$$DED = \int_{t_1}^{t_2} \sigma_{\theta\theta} d\varepsilon_{\theta\theta}$$

where $\sigma_{\theta\theta}$ is the tangential stress in the inner skin of the cladding 33 in MPa, and $\varepsilon_{\theta\theta}$ is the total tangential deformation in the inner skin of the cladding 33.

The integration starts when the speed of deformation in the inner skin exceeds a threshold value set at $10^{-5}$ s$^{-1}$, and stops when the speed falls below this threshold.

Since the calculation of the stress or the DED must be used for the protection of the reactor 1 during accidents that may have rapid kinetics, it cannot be performed by a thermomechanical code such as COPERNIC.

To meet the protection response time requirement, it is planned to use a meta-model 50 of the thermomechanical code in step S24. The meta-model 50 is, for example, a meta-model of the thermomechanical code COPERNIC.

The meta-model 50 is typically a multilayer neural network.

The meta-model 50 uses a nonlinear function as a transfer function, for example sigmoid.

The meta-model 50 uses at each time step, i.e. at each iteration of the computation, at least the following inputs:
mechanical stress or deformation energy density calculated at the previous time step: $\alpha(t-dt)$;
reconstructed maximum linear power: $P_{lin}^{max}(t)$
derivative with respect to time of the reconstructed maximum linear power: $dP_{lin}^{max}(t)/dt$,
burnup fraction calculated for the control section: TE(t).

The mechanical stress or deformation energy density at the current time step $\sigma(t)$ is the only output of the meta-model.

The reconstructed maximum linear power is the one calculated in the step S12. The burnup rate calculated for the control section is the one stored in the sub-step S22.

The calculation of the mechanical stress or deformation energy density is performed by the meta-model 50 according to the general algorithm:

$$\sigma(t) = \sigma(t - dt) + A\left(\frac{dP_{lin}^{max}(t)}{dt}\right)dt + BP_{lin}^{max}(t)$$

where A and B are constants.

Figure 5:
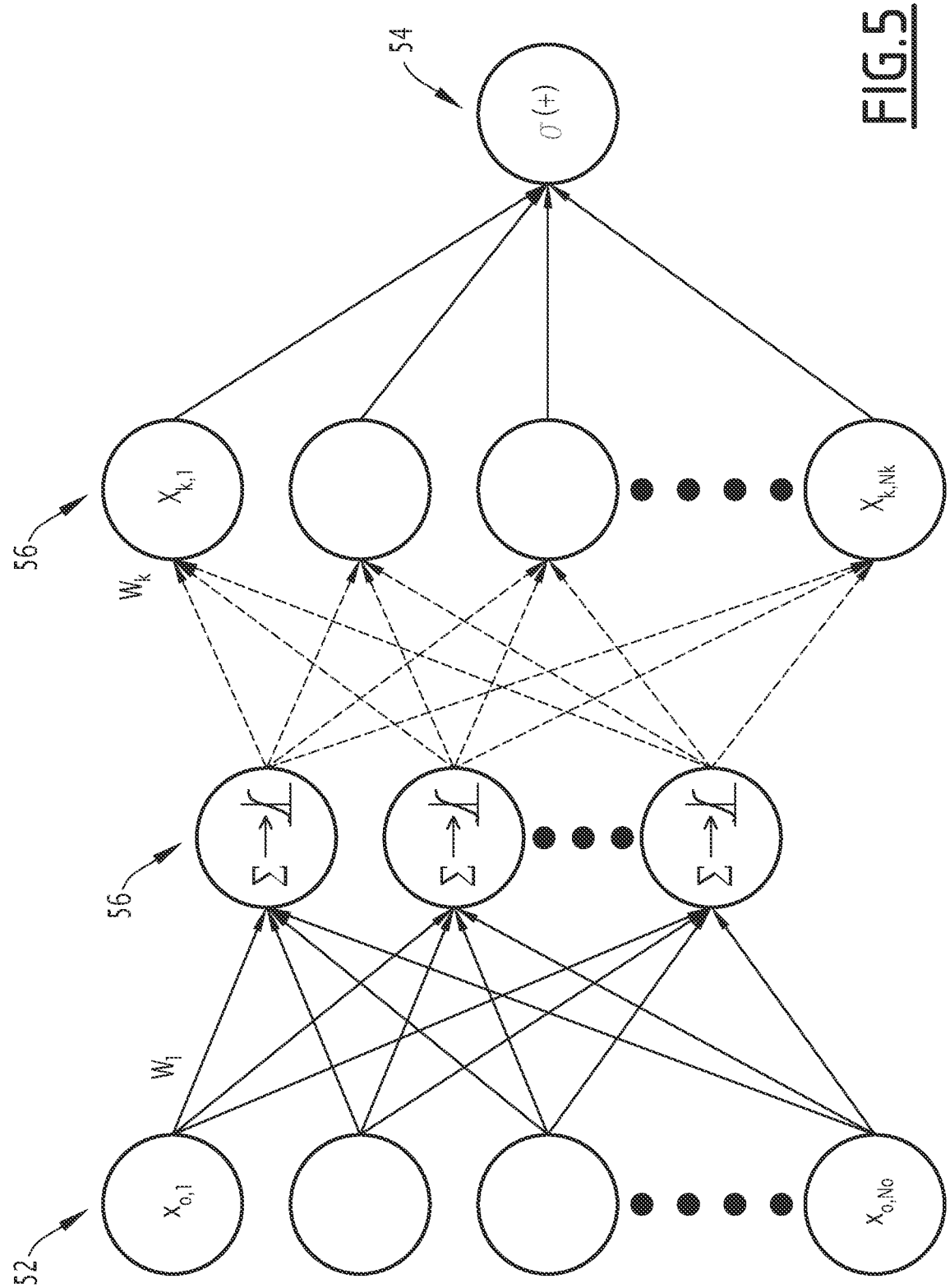
FIG. 5 is a simplified schematic representation of a meta-model of the type used in the method in FIG. 4.

More precisely, as shown in FIG. 5, the neural network comprises an input layer 52 located on the left side of FIG. 5, an output layer 54 located on the right side of FIG. 5, and one or more intermediate layers 56 still called hidden layers. In FIG. 5, two intermediate layers 56 are shown. However, the neural network could comprise any number of intermediate layers.

The input layer comprises one neuron for each of the scalar inputs mentioned above, i.e. four neurons. The output layer 54 comprises a single neuron, corresponding to the quantity of interest Y reconstructed in line, i.e. the stress or the DED according to the following factorized formula:

$$Y(X_0) = [\Pi_{i=1}^{i=nH+1} \sigma_i \cdot A_i] \cdot X_0$$

The or each hidden layer 56 has a certain number of neurons, for example at least five neurons.

The number of hidden layers and the number of neurons in the or each hidden layer is determined during the programming or learning phase of the neural network.

The inputs constitute a vector, called input vector and noted $X_0$. In the case of the present disclosure:

$$X_0 = \left(\sigma(t - dt), \frac{dP_{lin}^{max}}{dt}(t), P_{lin}^{max}(t), TE\right)$$

Each hidden layer i of the neural network elaborates a vector value $X_i$, by processing the vector value $X_{i-1}$ from the immediately preceding layer i−1.

Thus, for each hidden layer i $$X_i = f_i \cdot A_i \cdot X_{i-1}$$

where i is between 1 and nH, the number of hidden layers, $A_i$ is a predetermined matrix of dimension $N_i * N_{i-1}$, where $N_i$ is the number of neurons in layer i and $N_{i-1}$ is the number of neurons in layer i−1.

$f_i$ is a predetermined nonlinear operator. The operator f is, for example, a sigmoid transfer function acting on each component of the vector.

The non-linear operators $f_i$ each act as a non-linear function, for example, sigmoid on all the components of the vector $A_i X_{i-1}$. A sigmoid function is a function expressed as follows:

$$f(x) = 1/(1 + e^{-\lambda x})$$

where $\lambda$ is a predetermined constant

Each $A_i$ matrix acts as an affine transformation on the components of the $X_{i-1}$ vector. In other words:

$$A_i X_{i-1} = W_i X_{i-1} + b_i$$

where $W_i$ is the matrix of synaptic weights that link the $N_i$ neurons of the layer i to the $N_{i-1}$ neurons i−1, and $b_i$ is the vector of the $N_i$ dimensional bias of the layer i. For the last layer we note that the matrix $A_{nH+1}$ is of dimension $1 \times N_{nH}$ and that $\sigma_{nH+1}=1$: there is no application of a non-linear transfer function to establish the signal Y of the last layer.

In step S30, the mechanical stress calculated in sub-step S26 is compared to a predetermined threshold, or the calculated deformation energy density sub-step S28 is compared to a predetermined threshold.

The said threshold is equal to the technological limit of the considered cladding: TRESCA stress leading to failure for the zircaloy cladding, DED leading to failure for the M5 cladding.

In step S32, an automatic reactor shutdown procedure is initiated if the calculated mechanical stress or the calculated deformation energy density exceeds the said respective threshold.

This automatic shutdown is performed by lowering at high speed the shutdown clusters 20 into the core 2 of the nuclear reactor. This operation is fully automatic.

The risk of cladding rupture does not necessarily occur at the hot point of the core, i.e. at the level of the cladding section seeing the maximum linear power. The risk of rupture is greater, on the contrary, at the level of a slightly less powerful fuel rod section, but more brittle due to a higher burnup fraction.

The calculation of the stress or the DED at the hot spot of the core, i.e. in the cladding section with the maximum linear power, is therefore not entirely conservative.

Advantageously, in the process of the present disclosure, a predetermined bias is applied to the technological limit of the cladding considered, constituting the trigger threshold for the automatic shutdown of the reactor at stage S32. The bias consists of a decrease in the technological limit.

In this case, the method advantageously includes a step S10 to determine the bias.

The step S10 is carried out during a study phase, called the IPG study phase, which takes place before the implementation of steps S12, S14, S24, S30 and S32.

This step S10 is performed only once and is not repeated.

The bias is predetermined in the sense that the same bias is used in each iteration of the present disclosure's method.

Figure 6:
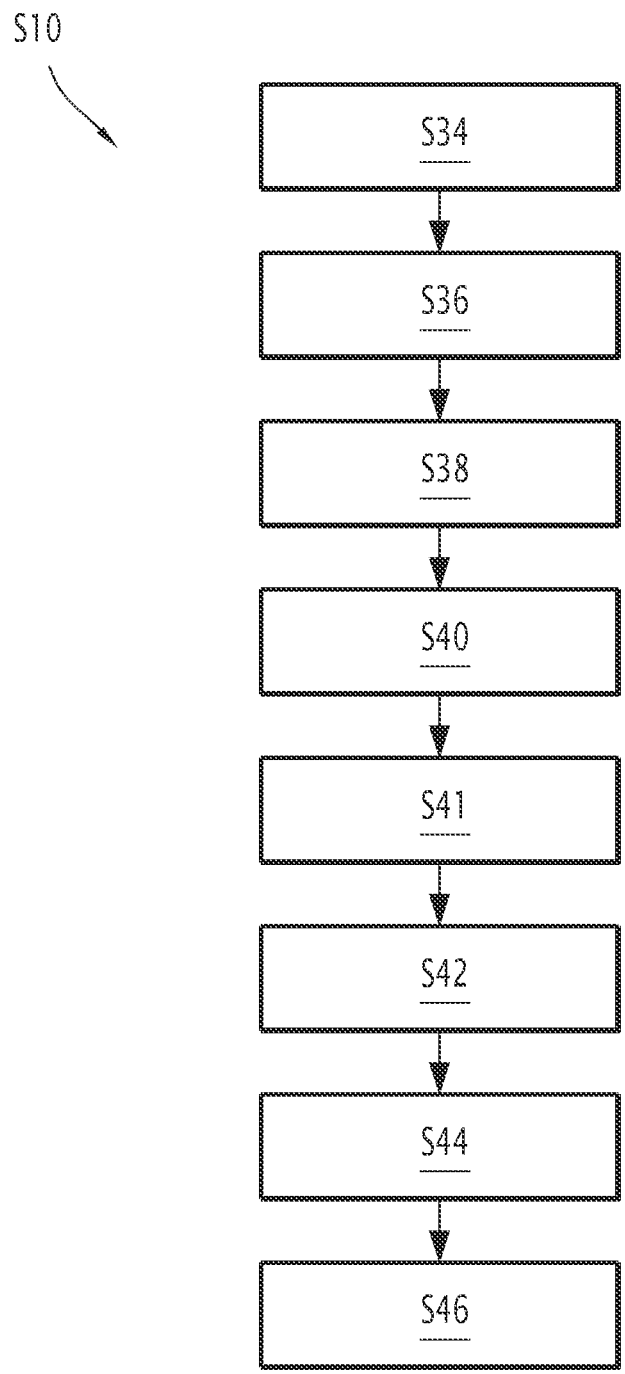
FIG. 6 is a step diagram detailing the preliminary step of determining the bias applied to the thermomechanical state considered for the step of calculating the mechanical stress or the DED in the method in FIG. 4.

As shown in FIG. 6, the step S10 for determining the bias comprises the following sub-steps:

sub-step S34: calculating the initial thermomechanical state and initial fuel rod burnup fraction 24;

sub-step S36: calculating the evolution over time of the mechanical stress or the deformation energy density in the cladding 33 of the fuel rods 24 from the initial calculated thermomechanical state and the initial calculated burnup fraction of the fuel rods 24, for at least one accidental transient, using a thermomechanical code;

sub-step S38: determining the calculated maximum mechanical stress or calculated deformation energy density using the said thermomechanical code;

sub-step S42: calculating the evolution over time of the mechanical stress or the deformation energy density in the cladding 33 of the fuel rods 24 from the initial thermomechanical state and the initial fuel burnup fraction at the location of the calculated maximum linear power of the fuel rods 24, for the said at least one accidental transient, using meta-model 50 of the thermomechanical code, taking into account a simulation of the evolution of the said reconstructed maximum linear power in step S12;

sub-step S44: determining the calculated maximum mechanical stress or calculated deformation energy density using the meta-model 50 of the thermomechanical code;

sub-step S46; determining the bias, based on the difference between on the one hand the calculated maximum mechanical stress or calculated deformation energy density using the said thermomechanical code and on the other hand the calculated maximum mechanical stress or calculated deformation energy density using the meta-model 50 of the thermomechanical code.

These sub-steps are all carried out in the design office, during the IPG safety studies.

The sub-step S34 is carried out by simulating the evolution of the fuel rods 36 during the sequence of fuel management cycles for the nuclear reactor. The standard operating cycles of the nuclear reactor are considered here.

This simulation is carried out using, for example, software for modelling the neutron behaviour of the fuel rods 24.

The initial thermomechanical state of the fuel rods is determined using a thermomechanical code, for example COPERNIC.

The accidental transient(s) simulated in the sub-step 36 are so-called Category 2 accidental transients, inducing the largest and fastest power variations in the core 2. These transients are, for example, the following:

excessive load increase;

uncontrolled withdrawal of control cluster 20 groups, while the reactor is on power;

fall of clusters 20.

These transients are described in more detail in FR2846139.

In the sub-step S36, the evolution of the calculated mechanical stress or calculated deformation energy density is using a thermomechanical code such as COPERNIC.

This evolution is typically calculated for the cladding 33 of all the fuel rods 24. It is calculated at all points in the cladding of each fuel rod.

The maximum determined in sub-step S38 corresponds to the highest value of the mechanical stress or DED encountered for a cladding section during the or each transient. The length of the considered section is fixed by the axial mesh of the thermomechanical code.

The step S10 also includes a step S40 to calculate the evolution over time of the reconstructed maximum linear power by the protection system 43 for the said at least one accidental transient.

In the sub-step S40, the maximum linear power that would be reconstructed in step S12 of the method is therefore simulated.

The step S10 also includes a sub-step S41 for storing the thermomechanical state and the burnup fraction of a control section. This control section corresponds to the fuel rod 24 section releasing the maximum linear power in the initial state of the fuel rods 24. This initial state is the one calculated in sub-step S34.

The sub-step S42 is performed using the meta-model 50 used in the step S24. The evolution of the reconstructed maximum linear power, determined in sub-step 40, is one of the inputs of this meta-model for sub-step S42. The thermomechanical state and the burnup fraction of the control section obtained in sub-step S41 constitutes another input of the meta-model 50 for the sub-step S42.

In sub-step S44, the determined maximum corresponds to the highest value of mechanical stress or DED encountered at the core hot spot as estimated by the protection system 43.

At the sub-step S46, the bias is determined by comparing the maximum obtained at the sub-step S38 and the maximum obtained at the sub-step S44, for the or each transient.

The bias to be applied to the initial thermomechanical state of the control section is chosen so that the maximum calculated by meta-model 50 in the step S44 is always greater than or equal to the maximum calculated by the thermomechanical code in step S38, for all the transients considered.

The bias is, for example, a stress or DED deviation deduced from the corresponding technological limit.

The protection method described above has been described with reference to the use of calculation codes such as SMART and COPERNIC. Alternatively, it is implemented using other equivalent calculation codes.

The method of the present disclosure may be implemented using any type of monitoring system, provided that it allows on-line determination of the power distribution in three dimensions, and that it incorporates a thermomechanical code configured to determine the fuel conditioning.

Similarly, it has been described above that the protection method included the calculation of mechanical stress or deformation energy density, depending on the type of fuel rod cladding. It would be possible to calculate both stress and deformation energy density.

The protection method has been described in a pressurized water reactor (PWR) application. Alternatively, it is applied to any other suitable type of nuclear reactor.

What is claimed is:

1. A method for protecting a nuclear reactor, the nuclear reactor comprising a core having a plurality of nuclear fuel assemblies, each assembly comprising a plurality of fuel rods, each fuel rod comprising a cladding and nuclear fuel enclosed in the cladding, the method comprising repeatedly carrying out the following steps:
   reconstructing a current maximum linear power released among the fuel rods of the nuclear fuel assemblies of the core, the reconstructing step being repeated with a time constant less than one minute;
   calculating a thermomechanical state and a burnup fraction for each of the fuel rods and storing the calculated thermomechanical state and calculated burnup fraction for a control section of one of the fuel rods;
   calculating a current mechanical stress or a current deformation energy density in the cladding of the one fuel rod using the reconstructed current maximum linear power, the stored thermomechanical state and the stored burnup fraction, by a meta-model of a thermomechanical code;
   comparing the calculated current mechanical stress or the calculated current deformation energy density with a respective threshold; and
   stopping the nuclear reactor if the calculated current mechanical stress or the calculated current deformation energy density exceeds the respective threshold.

2. The method according to claim 1, wherein the step of reconstructing the current maximum linear power is carried out using measurements provided continuously by neutron flux sensors.

3. The method according to claim 1, wherein the step of calculating the thermomechanical state and the burnup fraction of each the fuel rods comprises a sub-step of calculating a three-dimensional power distribution in the core, and a sub-step of calculating the burnup fraction of each of the fuel rods using the calculated three-dimensional power distribution.

4. The method according to claim 3, wherein the step of calculating the thermomechanical state and the burnup fraction of each of the fuel rods comprises a sub-step of calculating the thermomechanical state of the fuel rods by the thermomechanical code using the calculated three-dimensional power distribution.

5. The method according to claim 1, wherein the control section is the section with the maximum linear power.

6. The method according to claim 1, wherein the meta-model of the thermomechanical code uses at least the following inputs: mechanical stress or deformation energy density calculated at a previous time step, the reconstructed current maximum linear power, a derivative with respect to time from the reconstructed current maximum linear power, and the stored burnup fraction.

7. The method according to claim 1, wherein the meta-model of the thermomechanical code is a multilayer neural network.

8. The method according to claim 1, wherein a predetermined bias is applied to the respective threshold.

9. The method according to claim 8, wherein the method comprises a step for determining the bias, comprising the following sub-steps:
   calculating an initial thermomechanical state and an initial burnup fraction of the fuel rods;
   calculating an evolution over time of the mechanical stress or the deformation energy density in the cladding of the fuel rods from the initial thermomechanical state and the initial burnup fraction of the fuel rods calculated, for at least one accidental transient, by said thermomechanical code;
   determining a maximum mechanical stress or deformation energy density calculated by the thermomechanical code;
   calculating an evolution over time of the mechanical stress or the deformation energy density in the cladding of the fuel rods from the initial thermomechanical state and the initial fuel burnup fraction at the location of the calculated maximum linear power of the fuel rods, for the said at least one accidental transient, by the said meta-model of the thermomechanical code, taking into account a simulation of the evolution of the reconstructed current maximum linear power reconstructed at the reconstructing step;
   determining a maximum mechanical stress or deformation energy density calculated by the said meta-model of the thermomechanical code; and
   determining the bias, based on the difference between the maximum mechanical stress or deformation energy density calculated by the said thermomechanical code on the one hand and the maximum mechanical stress or deformation energy density calculated by the said meta-model of the thermomechanical code on the other hand.

10. A nuclear reactor comprising:
   a core having a plurality of nuclear fuel assemblies each assembly comprising a plurality of fuel rods, each fuel rod comprising a cladding and a nuclear fuel enclosed in the cladding; and
   a reactor monitoring and protection assembly comprising an information processing device configured to implement the method of claim 1.

* * * * *